US009298026B2

(12) United States Patent
Park et al.

(10) Patent No.: US 9,298,026 B2
(45) Date of Patent: Mar. 29, 2016

(54) DISPLAY DEVICE AND METHOD OF MANUFACTURING THE SAME

(75) Inventors: Jinwoo Park, Busan (KR); Sungmin Jung, Incheon (KR); Wook Jeon, Dajeon (KR); Youngbok Lee, Goyang-si (KR); Hyungju Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 338 days.

(21) Appl. No.: 13/075,823

(22) Filed: Mar. 30, 2011

(65) Prior Publication Data

US 2012/0033397 A1 Feb. 9, 2012

(30) Foreign Application Priority Data

Aug. 4, 2010 (KR) .................. 10-2010-0075224

(51) Int. Cl.
*G02F 1/1333* (2006.01)

(52) U.S. Cl.
CPC .............. *G02F 1/133308* (2013.01); *G02F 2001/133317* (2013.01); *Y10T 29/49002* (2015.01)

(58) Field of Classification Search
CPC .............. G02F 1/133308; G02F 2001/133317
USPC .................. 361/679.21–679.3; 345/169.905; 349/58.65; 248/176.1, 346.01, 225.21; 455/575.1, 550.1, 347; 29/592.1
See application file for complete search history.

(56) References Cited

U.S. PATENT DOCUMENTS

| 5,659,376 | A | * | 8/1997 | Uehara | G02F 1/133308 348/794 |
| 6,252,639 | B1 | * | 6/2001 | Giannatto | G02F 1/1333 349/58 |
| 7,283,118 | B2 | * | 10/2007 | Nagatani | G02F 1/133604 345/101 |
| 7,692,732 | B2 | * | 4/2010 | Tsubokura et al. | G02F 1/133308 349/58 |
| 7,697,273 | B2 | * | 4/2010 | Kawano | G02F 1/133308 248/917 |
| 2006/0133018 | A1 | * | 6/2006 | Okuda | G02F 1/133308 361/679.26 |
| 2008/0055834 | A1 | * | 3/2008 | Matsuzaki | G02F 1/133308 361/679.01 |
| 2009/0180244 | A1 | * | 7/2009 | Kiyohara | G02F 1/13338 361/679.01 |
| 2010/0014232 | A1 | * | 1/2010 | Nishimura | B29C 45/14073 361/679.3 |

FOREIGN PATENT DOCUMENTS

| CN | 101289597 A | 10/2008 |
| JP | 2005077551 A | 3/2005 |
| JP | 2008083491 A | 4/2008 |

OTHER PUBLICATIONS

Office Action issued in corresponding Chinese Patent Application No. 201110159860.6, mailed Sep. 18, 2013, 16 pages.
Office Action issued in corresponding Chinese Patent Application No. 201110159860.6, mailed Feb. 18, 2014, 15 pages.

* cited by examiner

*Primary Examiner* — Zachary M Pape
*Assistant Examiner* — Douglas Burtner
(74) *Attorney, Agent, or Firm* — Brinks Gilson & Lione

(57) ABSTRACT

A display device and a method of manufacturing the same are disclosed. The display device includes a first panel, a panel supporter including a bottom part in which the first panel is received, a first pad that is positioned on the bottom part of the panel supporter and attaches the first panel to the panel supporter, a second panel positioned on the first panel, a cover including a surface part covering a partial outer wall of the second panel, and a second pad that is positioned under the surface part of the cover and attaches the second panel to the cover.

20 Claims, 6 Drawing Sheets

DISPLAY DEVICE AND METHOD OF MANUFACTURING THE SAME

This application claims the benefit of the Korean Patent Application No. 10-2010-0075224, filed in Korea on Aug. 4, 2010, which are hereby incorporated by reference as if fully set forth herein.

BACKGROUND

1. Field of the Invention

Embodiments of the disclosure relate to a display device and a method of manufacturing the same.

2. Discussion of the Related Art

As information technology has been developed, the market of display devices corresponding to a connection medium between a user and information has grown. Hence, the use of the display devices such as an organic light emitting diode (OLED) display, a liquid crystal display (LCD), and a plasma display panel (PDP) has been increasing.

The display devices have been widely used in consumer electronics such as a television and a video player and in electronics industry such as a notebook, a computer, and a cellular phone.

The display devices have been recently manufactured by attaching two panels to each other, thereby using as a reversible display device or a stereoscopic image display. Because the reversible display device may reversibly display images on the two panels, a user may view the image through the two attached panels. Because the stereoscopic image display may display a stereoscopic image on the panel, the user may view the stereoscopic image based on the control of the two panels.

In the related art, when the display devices use as the reversible display device or the stereoscopic image display, two panels are received in a structure and are fixed using the structure. However, in the related art display devices thus manufactured, one of the two panels may move. Further, one of the two panels may be divided by the other panel.

BRIEF SUMMARY

In one aspect, there is a display device comprising a first panel, a panel supporter including a bottom part in which the first panel is received, a first pad positioned on the bottom part of the panel supporter, the first pad configured to attach the first panel to the panel supporter, a second panel positioned on the first panel, a cover including a surface part covering a partial outer wall of the second panel, and a second pad positioned under the surface part of the cover, the second pad configured to attach the second panel to the cover.

In another aspect, there is a method of manufacturing a display device comprising forming a first pad on a bottom part of a panel supporter, attaching a first panel to the first pad, forming a second pad under a surface part of a cover, attaching a second panel to the second pad, and aligning the cover on the panel supporter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Figure 1:
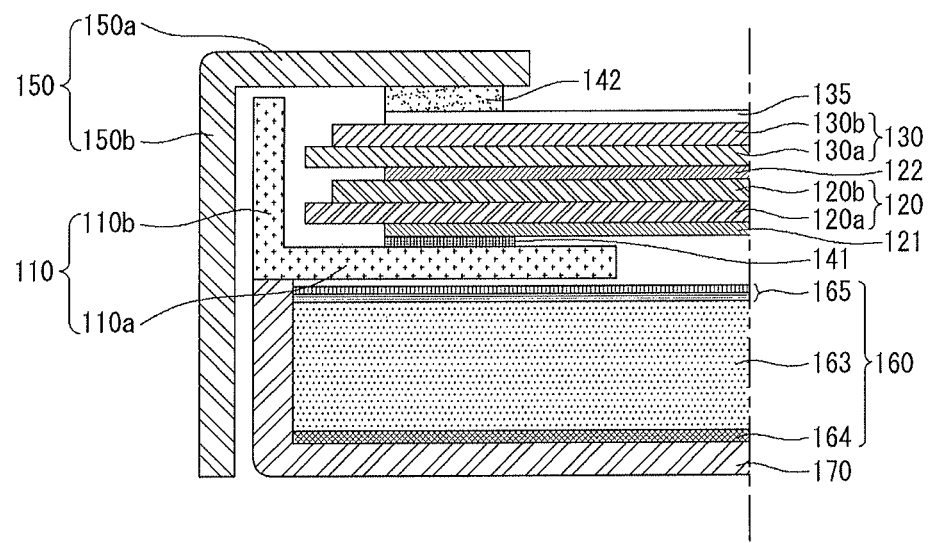
FIG. 1 is a cross-sectional view of a display device according to a first exemplary embodiment of the invention.

FIG. 1 is a cross-sectional view of a display device according to a first exemplary embodiment of the invention.

As shown in FIG. 1, the display device according to the first exemplary embodiment of the invention includes a first panel 120, a panel supporter 110, a first pad 141, a second panel 130, a cover 150, a second pad 142, a backlight unit 160, and a cover bottom 170.

The first panel 120 is a panel displaying an image. For example, the first panel 120 may be implemented as a liquid crystal display panel including a transistor array substrate 120*a* and a color filter substrate 120*b*. Data lines and gate lines are formed on the transistor array substrate 120*a* of the liquid crystal display panel to cross at right angles. Subpixels defined by the data lines and the gate lines are disposed on the transistor array substrate 120*a* in a matrix form. A thin film transistor (TFT) formed at each of crossings of the data lines and the gate lines transfers a data voltage supplied through the data lines to a pixel electrode of a liquid crystal cell in response to a scan pulse from the gate lines. For this, a gate electrode of the TFT is connected to the gate line, a source electrode of the TFT is connected to the data line, and a drain electrode of the TFT is connected to the pixel electrode of the liquid crystal cell. A common voltage is supplied to a common electrode opposite the pixel electrode. In a vertical electric field driving manner such as a twisted nematic (TN) mode and a vertical alignment (VA) mode, the common electrode is formed on the color filter substrate 120*b*. In a horizontal electric field driving manner such as an in-plane switching (IPS) mode and a fringe field switching (FFS) mode, the common electrode is formed on the transistor array substrate 120*a* along with the pixel electrode. Black matrixes, color filters, etc. are formed on the color filter substrate 120*b* attached to the transistor array substrate 120*a*. The liquid crystal display panel applicable to the embodiment of the invention may be implemented in any liquid crystal mode as well as the TN, VA, IPS, and FFS modes. Further, the liquid crystal display panel applicable to the embodiment of the invention may be implemented as a panel of any type liquid crystal display including a backlit liquid crystal display, a transflective liquid crystal display, and a reflective liquid crystal display. As above, a lower polarizing plate 121 and an upper polarizing plate 122 are respectively attached to the transistor array substrate 120*a* and the color filter substrate 120*b* of the first panel 120 implemented as the liquid crystal display panel. Other kinds of display panels may be used for the first panel 120.

The panel supporter 110 includes a bottom part 110*a*, on which the first panel 120 is received, and a side wall part 110*b* which extends in a vertical direction so as to protect the received first panel 120. The panel supporter 110 may be a supporter referred to as a guide panel in a configuration of a liquid crystal display. Other structures may be used for the panel supporter 110. In the embodiment of the invention, a lower surface of the bottom part 110a of the panel supporter 110 is a surface facing the backlight unit 160, and an upper surface of the bottom part 110a is a surface opposite the lower surface.

The first pad 141 is formed on the upper surface of the bottom part 110a of the panel supporter 110 and attaches the first panel 120 to the panel supporter 110. At least one surface of the first pad 141 has an adhesive strength, so that the first panel 120 is attached to the panel supporter 110 and does not move. Further, both surfaces of the first pad 141 contain an adhesive material for the attachment between the panel supporter 110 and the first panel 120. The first pad 141 may represent a black-based color so as to prevent light coming from the backlight unit 160 under the first panel 120 from being leaked in a predetermined direction.

The second panel 130 is a panel for controlling the image displayed on the first panel 120. For example, the second panel 130 may be implemented as a retardation panel including a lower substrate 130a and an upper substrate 130b. Hence, a quarter-wave plate (QWP) 135 is attached to one surface of the upper substrate 130b of the second panel 130. Other kinds of display panels may be used for the second panel 130. For example, the second panel 130 may be configured so that the image displayed on the first panel 120 is divided into a left eye image and a right eye image.

The cover 150 includes a surface part 150a covering a partial outer wall of the second panel 130 and an outer wall part 150b that extends in a vertical direction so as to cover the side wall part 110b of the panel supporter 110. The cover 150 may be a supporter referred to as a case top in the configuration of the liquid crystal display. Other structures may be used for the cover 150. A lower surface of the surface part 150a of the cover 150 is a surface facing the second panel 130, and an upper surface of the surface part 150a is a surface opposite the lower surface.

The second pad 142 is formed on the lower surface of the surface part 150a of the cover 150 and attaches the second panel 130 to the cover 150. At least one surface of the second pad 142 has an adhesive strength, so that the second panel 130 is attached to the cover 150 and does not move. Further, both surfaces of the second pad 142 contain an adhesive material for the attachment between the cover 150 and the second panel 130. The second pad 142 may represent a black-based color so as to prevent light coming from the backlight unit 160 under the second panel 130 from being leaked in a predetermined direction.

The backlight unit 160 is positioned on the lower surface of the bottom part 110a of the panel supporter 110 and is received in the cover bottom 170. The backlight unit 160 includes a light guide plate 163, a reflection plate 164, and an optical member 165. The light guide plate 163 guides light from light sources (not shown) of the backlight unit 160 to the first panel 120. The reflection plate 164 upward reflects the light incident on the light guide plate 163. The optical member 165 diffuses and focuses the light from the light guide plate 163. Other structures may be used for the backlight unit 160.

As described above, the first pad 141 is used to attach the first panel 120 to the panel supporter 110, and the second pad 142 is used to attach the second panel 130 to the cover 150. The first pad 141 and the second pad 142 may be substantially equal to or different from each other in a size and a thickness depending on the sizes of the first and second panels 120 and 130 and a separated distance between the panel supporter 110 and the cover 150. A foreign material may be prevented from entering into the panel supporter 110 and the cover 150 by adjusting the thicknesses, the sizes, and the shapes of the first and second pads 141 and 142.

The display device according to the embodiment of the invention may be implemented as a stereoscopic image display capable of displaying a stereoscopic image using the first and second panels 120 and 130 as an example. The stereoscopic image display may use a stereoscopic technique including a glasses type method and a non-glasses type method depending on the structure of the second panel 130, in addition to the above-described configuration.

The shapes of the second pad 142 are described below with reference to FIGS. 2 to 4.

Figure 2:
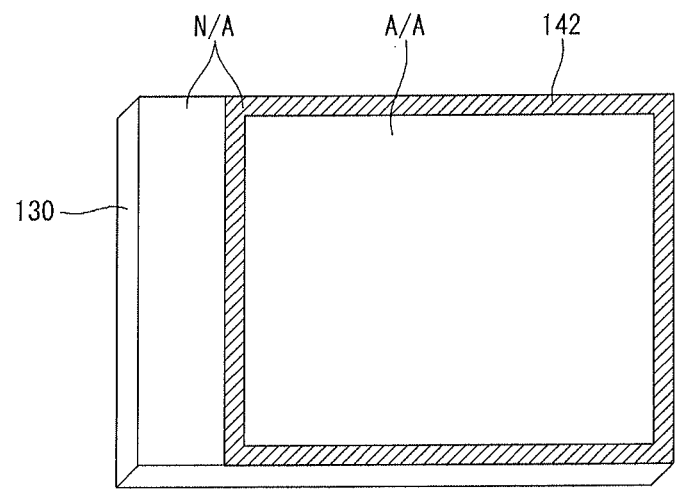
FIGS. 2 to 4 illustrate various shapes of a second pad.
Figure 3:
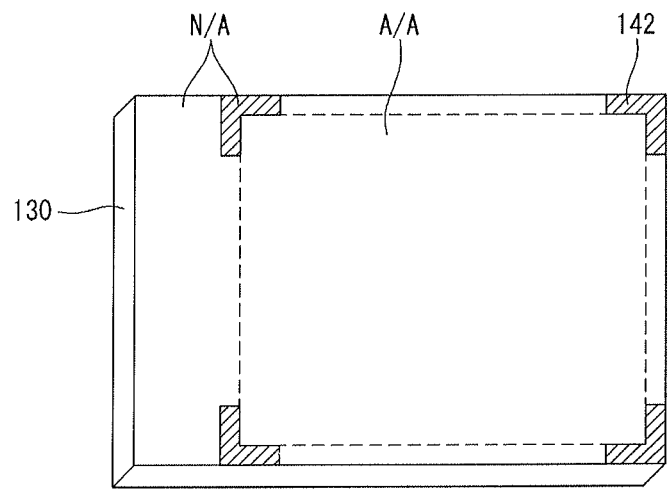
Figure 4:
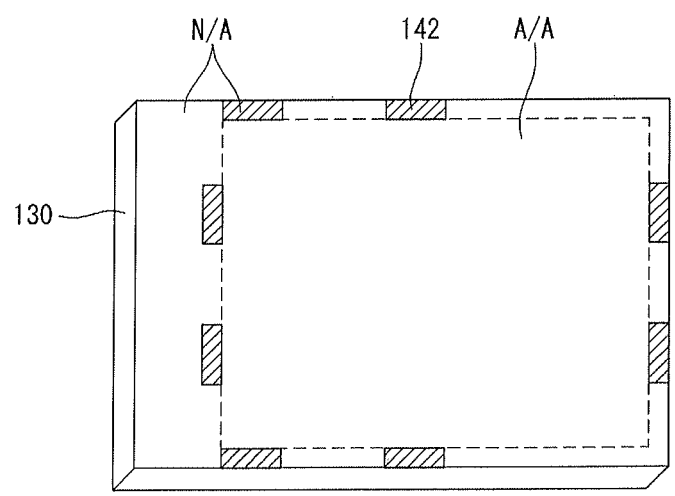

FIGS. 2 to 4 illustrate various shapes of the second pad.

As shown in FIGS. 2 to 4, the second pad 142 may be divided into a plurality of portions or may be formed in a closed curve.

As shown in FIG. 2, the second pad 142 may be formed in a rectangular closed curve surrounding a non-display region N/A of the second panel 130 so as to expose a display region A/A of the second panel 130.

As shown in FIG. 3, the second pad 142 may be divided into a plurality of portions, and the plurality of portions may be respectively disposed at edges of the non-display region N/A of the second panel 130 so as to expose the display region A/A of the second panel 130.

As shown in FIG. 4, the second pad 142 may be divided into a plurality of portions, and the plurality of portions may be disposed at predetermined locations of the non-display region N/A of the second panel 130 so as to expose the display region A/A of the second panel 130.

Although FIGS. 2 to 4 illustrate the shapes of the second pad 142, the first pad 141 may have the shapes illustrated in FIGS. 2 to 4 in the same manner as the second pad 142. Further, the first and second pads 141 and 142 may have the same shape or different shapes.

Figure 5:
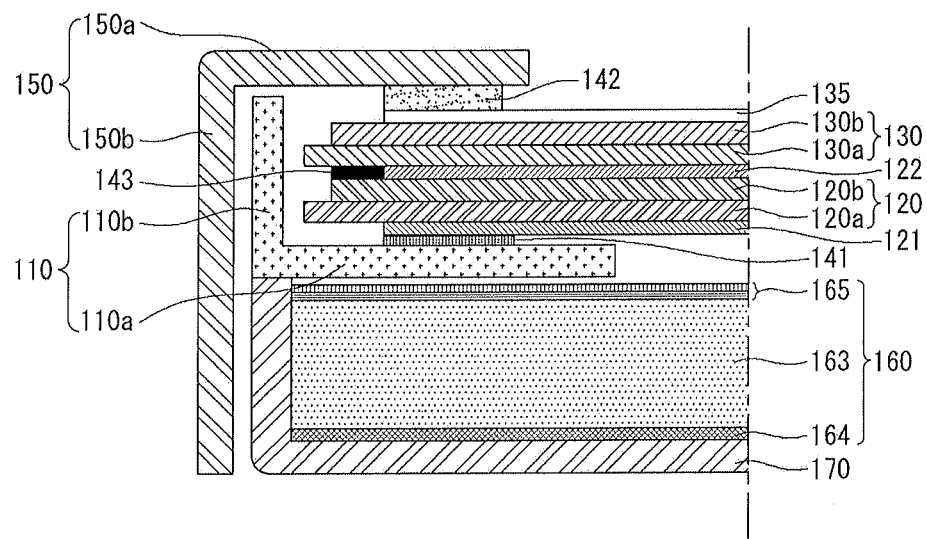
FIG. 5 is a cross-sectional view of a display device according to a second exemplary embodiment of the invention.

FIG. 5 is a cross-sectional view of a display device according to a second exemplary embodiment of the invention.

As shown in FIG. 5, the display device according to the second exemplary embodiment of the invention includes a first panel 120, a panel supporter 110, a first pad 141, a second panel 130, a cover 150, a second pad 142, a third pad 143, a backlight unit 160, and a cover bottom 170.

The third pad 143 is formed on one surface (i.e., a margin of a non-display region) of an outer wall of the first panel 120 or the second panel 130 and attaches the first panel 120 to the second panel 130. At least one surface of the third pad 143 has an adhesive strength, so that the first panel 120 and the second panel 130 are attached to each other and do not move. Further, both surfaces of the third pad 143 contain an adhesive material for the attachment between the first panel 120 and the second panel 130.

Since the display device according to the second exemplary embodiment of the invention is substantially the same as the display device according to the first exemplary embodiment of the invention except that the third pad 143 is added, a further description may be briefly made or may be entirely omitted. The third pad 143 may increase the adhesive strength between the first panel 120 and the second panel 130 and may prevent the movement of the first panel 120 and the second panel 130.

Figure 6:
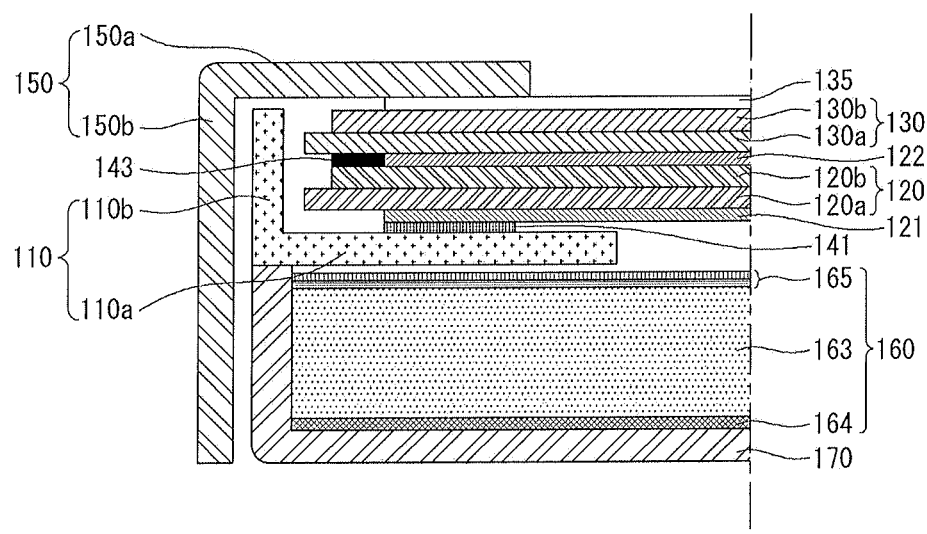
FIG. 6 is a cross-sectional view of a display device according to a third exemplary embodiment of the invention.

FIG. 6 is a cross-sectional view of a display device according to a third exemplary embodiment of the invention.

As shown in FIG. 6, the display device according to the third exemplary embodiment of the invention includes a first panel 120, a panel supporter 110, a first pad 141, a second panel 130, a cover 150, a third pad 143, a backlight unit 160, and a cover bottom 170.

The third pad 143 is formed on one surface (i.e., a margin of a non-display region) of an outer wall of the first panel 120 or the second panel 130 and attaches the first panel 120 to the second panel 130. At least one surface of the third pad 143 has an adhesive strength, so that the first panel 120 and the second panel 130 are attached to each other and do not move. Further, both surfaces of the third pad 143 contain an adhesive material for the attachment between the first panel 120 and the second panel 130.

Since the display device according to the third exemplary embodiment of the invention is substantially the same as the display device according to the first exemplary embodiment of the invention except that the third pad 143 is formed instead of the second panel 142, a further description may be briefly made or may be entirely omitted. The third pad 143 may increase the adhesive strength between the first panel 120 and the second panel 130 and may prevent the movement of the first panel 120 and the second panel 130.

Figure 7:
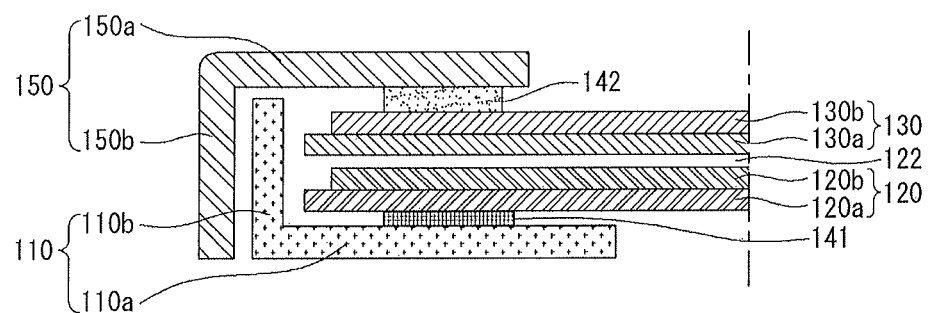
FIG. 7 is a cross-sectional view of a display device according to a fourth exemplary embodiment of the invention.

FIG. 7 is a cross-sectional view of a display device according to a fourth exemplary embodiment of the invention.

As shown in FIG. 7, the display device according to the fourth exemplary embodiment of the invention includes a first panel 120, a panel supporter 110, a first pad 141, a second panel 130, a cover 150, and a second pad 142.

In the display device shown in FIG. 7, the first panel 120 is not a liquid crystal display panel but an organic light emitting diode (OLED) display panel or a plasma display panel (PDP), for example. The first panel 120 is attached to the first pad 141 formed on a bottom part 110a of the panel supporter 110. The second panel 130 on the first panel 120 is attached to the second pad 142 positioned under a surface part 150a of the cover 150.

When the display device shown in FIG. 7 is a reversible display device, the second panel 130 is a panel displaying an image in the same manner as the first panel 120. On the other hand, when the display device shown in FIG. 7 is a stereoscopic image display, the second panel 130 is a panel for controlling an image displayed on the first panel 120.

The first pad 141 and the second pad 142 according to the fourth exemplary embodiment of the invention may have the same configuration as the first exemplary embodiment of the invention. Further, the fourth exemplary embodiment of the invention may have the same pad configuration as the second and third exemplary embodiments of the invention.

Hereinafter, a method of manufacturing the display device according to the first exemplary embodiment among the various embodiments of the invention is described as an example.

FIGS. 8 to 12 illustrate a method of manufacturing a display device according to an exemplary embodiment of the invention.

Figure 8:
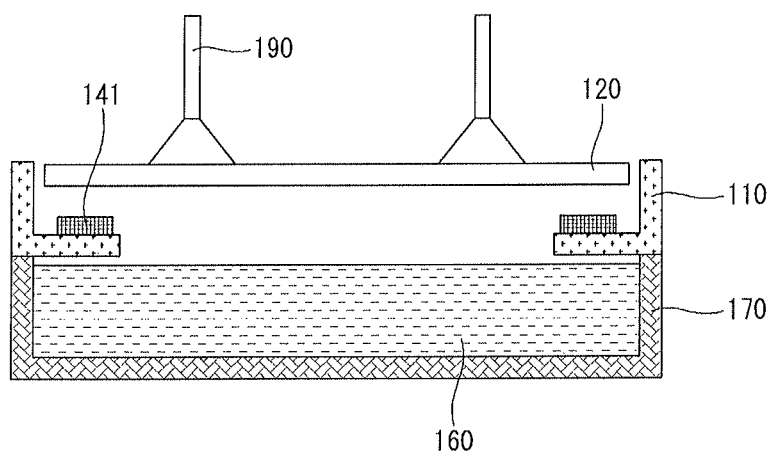
FIGS. 8 to 12 illustrate a method of manufacturing a display device according to an exemplary embodiment of the invention.

As shown in FIG. 8, the panel supporter 110 is formed on the cover bottom 170 in which the backlight unit 160 is received, and the first pads 141 are formed on the bottom part 110a of the panel supporter 110. Subsequently, a vacuum lifter 190 adsorbs the first panel 120 and loads the first panel 120 on the first pads 141.

Figure 9:
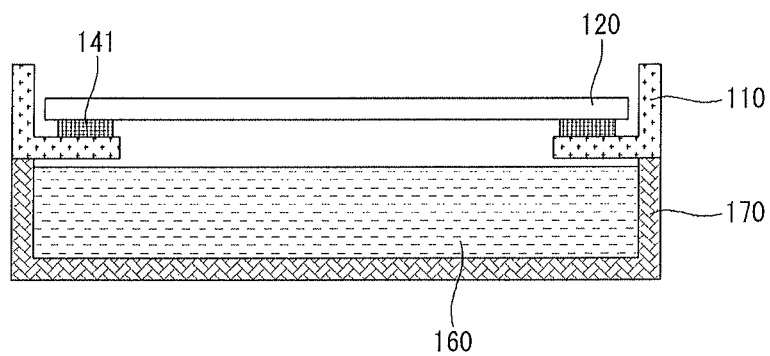

Next, as shown in FIG. 9, the first panel 120 is attached to the first pads 141 formed on the bottom part 110a of the panel supporter 110.

Figure 10:
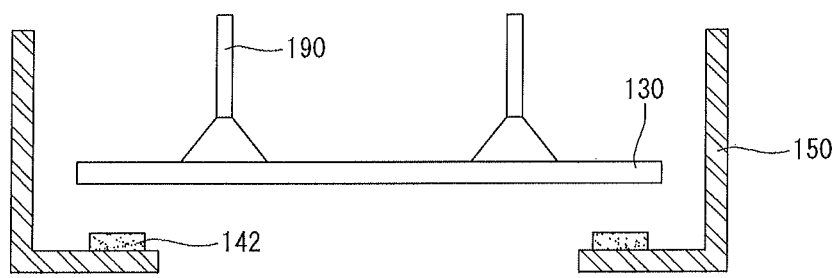

Next, as shown in FIG. 10, the second pads 142 are formed under the surface part 150a of the cover 150. Subsequently, the vacuum lifter 190 adsorbs the second panel 130 and loads the second panel 130 on the second pads 142.

Figure 11:
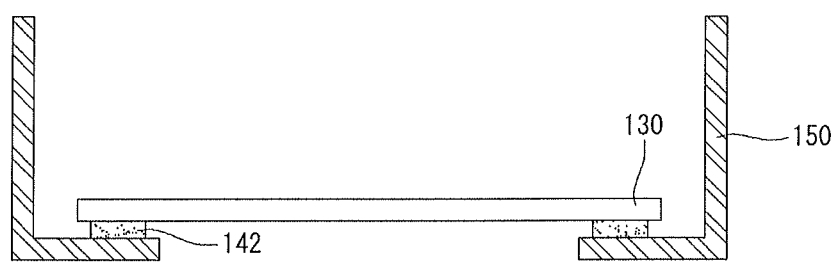

Next, as shown in FIG. 11, the second panel 130 is attached to the second pads 142 formed under the surface part 150a of the cover 150.

Figure 12:
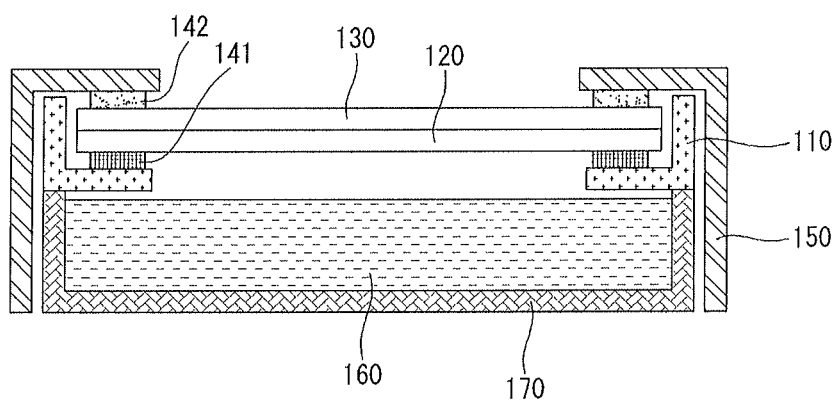

Next, as shown in FIG. 12, the cover 150 is aligned on the panel supporter 110. The cover 150 and the panel supporter 110 are assembled.

As described above, the first and second panels 120 and 130 are transferred and attached using the vacuum adsorption method. However, other methods may be used for the first and second panels 120 and 130.

Further, the above-described method of manufacturing the display device may be used to manufacture the display devices according to the other embodiments of the invention.

As described above, the exemplary embodiments of the invention provide the display device and the method of manufacturing the same capable of preventing one panel of the two panels from being divided by the other panel by reducing or preventing the movement of the two panels. Furthermore, the exemplary embodiments of the invention provide the display device and the method of manufacturing the same capable of removing the distance between the panel and the structure by using the pad to attach the panel to the structure. Hence, the foreign material is prevented from entering into the structure.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
    a first panel configured to display an image on the first panel;
    a panel supporter including a bottom part to which the first panel is attached and a side wall extending vertically from the bottom part, the panel supporter being an L-shape component, the bottom part and the side wall defining an L shape, the bottom part having a lower flat surface;
    a first pad positioned on the bottom part of the panel supporter to attach the first panel to the panel supporter;
    a second panel positioned on the first panel and displaying an image in the same manner as the first panel or controlling the image that has been displayed on the first panel, the first panel displaying the image on the first panel independently of an operation of the second panel;
    a cover including a surface part covering a partial outer wall of the second panel and an outer wall part extending vertically from the surface part;
    a second pad positioned under the surface part of the cover, the second pad configured to attach the second panel to the cover; and
    a cover bottom attached to the lower flat surface of the bottom part,
    wherein the cover and the panel supporter do not share any component.

2. The display device of claim 1, wherein at least one of the first pad and the second pad is divided into a plurality of portions or is formed in a closed curve.

3. The display device of claim 1, wherein the first pad and the second pad are substantially equal to or different from each other in a size and a thickness.

4. The display device of claim 1, further comprising a third pad configured to attach an outer wall of the first panel to an outer wall of the second panel.

5. The display device of claim 4, wherein at least one surface of each of the first to third pads has an adhesive strength.

6. The display device of claim 1, wherein the second panel is a panel controlling the image displayed on the first panel.

7. The display device of claim 1, further comprising a backlight unit that includes a light guide plate guiding light from light sources and a reflection plate reflecting the light incident on the light guide plate,
wherein the cover bottom and the bottom part of the panel supporter define a space between an upper surface of the cover bottom and the lower flat surface of the bottom part of the panel supporter, the light guide plate and the reflection plate of the backlight unit being received in the space.

8. A method of manufacturing a display device comprising:
forming a first pad on a bottom part of a panel supporter, the panel supporter including a side wall extending vertically from the bottom part, the panel supporter being an L-shape component, the bottom part and the side wall defining an L shape, the bottom part having a lower flat surface;
attaching a first panel configured to display an image to the first pad, the first panel displaying an image on the first panel;
forming a second pad under a surface part of a cover, the cover including an outer wall part extending vertically from the surface part;
attaching a second panel to the second pad, the second panel displaying an image in the same manner as the first panel or controlling the image that has been displayed on the first panel, the first panel displaying the image on the first panel independently of an operation of the second panel;
aligning the cover on the panel supporter; and
attaching a cover bottom to the lower flat surface of the bottom part,
wherein the second panel is a panel displaying an image or a panel controlling an image, and
wherein the cover and the panel supporter do not share any component.

9. The method of claim 8, wherein at least one of the first panel and the second panel is transferred and attached using a vacuum adsorption method.

10. The method of claim 8, wherein at least one surface of each of the first pad and the second pad has an adhesive strength,
wherein at least one of the first pad and the second pad is divided into a plurality of portions or is formed in a closed curve.

11. The method of claim 8, wherein the first pad and the second pad are substantially equal to or different from each other in a size and a thickness.

12. The method of claim 8, further comprising attaching an outer wall of the first panel to an outer wall of the second panel using a third pad.

13. The method of claim 12, wherein at least one surface of each of the first to third pads has an adhesive strength.

14. The method of claim 8, wherein the second panel is a panel controlling the image displayed on the first panel.

15. The method of claim 8, further receiving a backlight unit including a light guide plate and a reflection plate in a space between the lower flat surface of the bottom part of the panel supporter and an upper surface of the cover bottom.

16. The display device of claim 1, wherein at least one of the first pad and the second pad is formed in a closed curve.

17. The display device of claim 1, wherein the first pad and the second pad are different from each other in a size and a thickness.

18. The method of claim 8, wherein at least one surface of each of the first pad and the second pad has an adhesive strength,
wherein at least one of the first pad and the second pad is formed in a closed curve.

19. The method of claim 8, wherein the first pad and the second pad are different from each other in a size and a thickness.

20. The display device of claim 1, wherein wherein the cover bottom includes a bottom part parallel to the bottom part of the panel supporter and a vertical wall extending vertically from the bottom part of the cover bottom, the vertical wall of the cover bottom being aligned with the side wall of the panel supporter, the bottom part of the panel supporter being spaced apart from the bottom part of the bottom cover by the vertical wall of the cover bottom.

* * * * *